United States Patent [19]
Brun et al.

[11] Patent Number: 6,154,502
[45] Date of Patent: *Nov. 28, 2000

[54] SIGNAL CONSTELLATION SLICER

[75] Inventors: Zdenek Brun, Phoenix; Weiqiang Ma, Tempe, both of Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/701,695

[22] Filed: Aug. 22, 1996

[51] Int. Cl.⁷ .............................. H04L 23/02; H03D 1/00
[52] U.S. Cl. ............................................ 375/261; 375/340
[58] Field of Search ...................................... 375/261, 260, 375/259, 265, 269, 262, 263, 264, 286, 287, 290, 291, 271, 279, 280, 281, 285, 283, 298, 308, 302, 295, 284, 222, 223, 324, 316, 320, 329, 330, 331, 332, 340, 341; 332/103, 104, 105; 329/304, 305, 306, 307, 308, 309, 310; 371/43.1, 43.4, 43.8, 43.6, 43.7; 370/203, 206, 207; 1/1; 714/759

[56] References Cited

U.S. PATENT DOCUMENTS

| | | |
|---|---|---|
| 4,709,377 | 11/1987 | Martinez et al. .......................... 375/75 |
| 4,866,395 | 9/1989 | Hostetter ................................. 329/309 |
| 5,604,772 | 2/1997 | Botto et al. .............................. 375/341 |

OTHER PUBLICATIONS

Newton, Newton's Telecom Dictionary, pp. 652–654, Nov. 1994.

ADSP—2100 Family Applications Handbook. vol. 4. First edition, pp. 2–8 thru 2–40 and 3–1thru 3–5, 1990.

"A Modem Operating at Data Signalling Rates of Up To 28 800 BIT/s for Use on the General Switched Telephone Network and on Leased Point–To–Point 2–Wire Telephone–Type Circuits." International Telecommunication Union, ITU–T V.34, Sept. 20, 1994.

*Primary Examiner*—William Luther
*Attorney, Agent, or Firm*—Blakely, Sokoloff, Taylor, Zafman, LPP

[57] ABSTRACT

Data represented by a received point which is not within a boundary of a signal constellation having a set of points is obtained by comparing the received point to less than all of the points on a boundary of the signal constellation. In an embodiment, the received point is compared to no more than two points on the boundary which have been predetermined to be the closest to the received point.

18 Claims, 7 Drawing Sheets

SIGNAL CONSTELLATION SLICER

BACKGROUND OF THE INVENTION

1. Field of the Invention

This invention relates to the field of slicers in communications systems and more particularly to a slicer for associating a received point which falls outside of a signal constellation with a point in the signal constellation.

2. Background of the Related Art

In certain communications systems, each discrete data value used in communications between a transmitter and a receiver is represented by a point in a signal constellation. Each point therefore represents a sequence of binary bits. The signal constellation is comprised of a full set of valid data points, and is a subset of a larger grid of points, the grid being defined by X and Y axes. Grid points outside of the signal constellation do not represent data used in the communications system.

Each signal constellation point maps to X and Y grid coordinates. To transmit the data represented by a point, the X and Y grid coordinates of the point, which typically are represented by digital (binary) numbers, are first modulated and added. The product is converted from a digital number into an analog voltage and analog voltage is transmitted. Typically, a series of points (data values) are consecutively transmitted, such that the analog voltage appears as an analog waveform of varying amplitude.

At the receiver end, the analog voltage representing the point is converted to a digital number and demodulated to obtain the separate X and Y components. These components are used as coordinates to the grid and ideally map to the signal constellation point which was transmitted by the transmitter. To actually obtain the data represented by the received point, the coordinates are used to address a table holding the data corresponding to the point.

During transmission of an analog signal from the transmitter to the receiver, the shape and amplitude of the signal can be altered by extraneous forces, such as noise. Noise-affected voltages transmitted over a transmission medium which are converted to digital X and Y coordinates typically will map to a point on the grid which does not correspond identically to a signal constellation point. A slicer is used to determine which signal constellation point lies closest to the received point. If the received noise-affected coordinates map to a point which is in an area within the bounds of the signal constellation, the slicer will match the received point to the closest signal constellation point.

When received coordinates map to a point which is outside or on a boundary of the area of the signal constellation, the closest signal constellation point is difficult to determine. Various computationally-intensive calculations are usually required to identify the actual closest signal constellation point. These calculations consume a significant quantity of the valuable cycles of any processor performing the calculations.

SUMMARY OF THE INVENTION

Data represented by a received point which is not within a boundary of a signal constellation having a set of points is obtained by comparing the received point to less than all of the points on the boundary of the signal constellation.

BRIEF DESCRIPTION OF THE DRAWINGS

The following detailed description will be more fully understood with reference to the accompanying drawings in which.

DETAILED DESCRIPTION OF A PREFERRED EMBODIMENT

Figure 1:
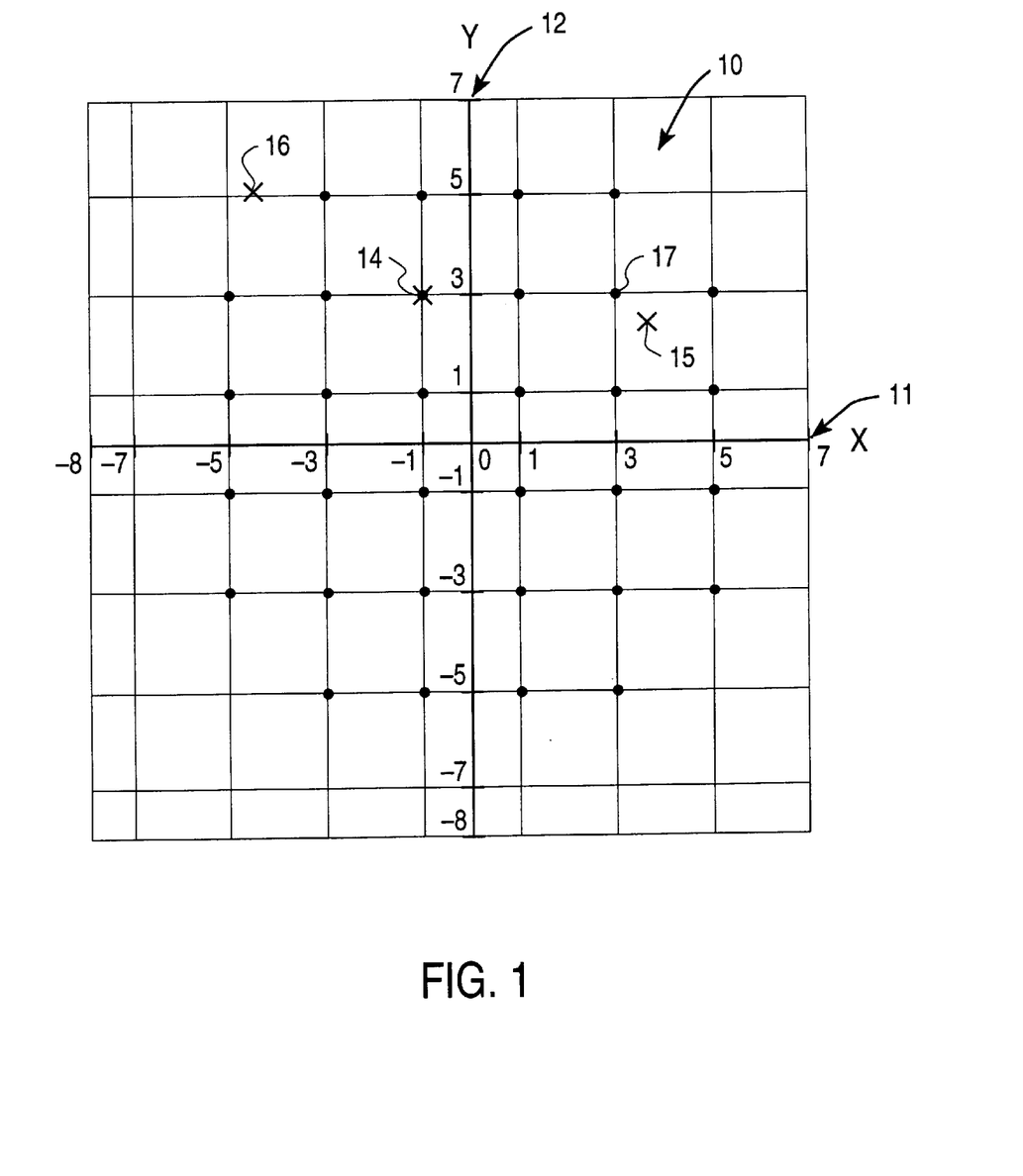
FIG. 1 is a representation of a signal grid including a signal constellation having a set of signal points.

FIG. 1 is a representation of a grid 13 including signal constellation 10 having a set of signal points. Each point in signal constellation 10 represents valid data used in communicating between transmit and receive nodes in a communications system.

Figure 2:
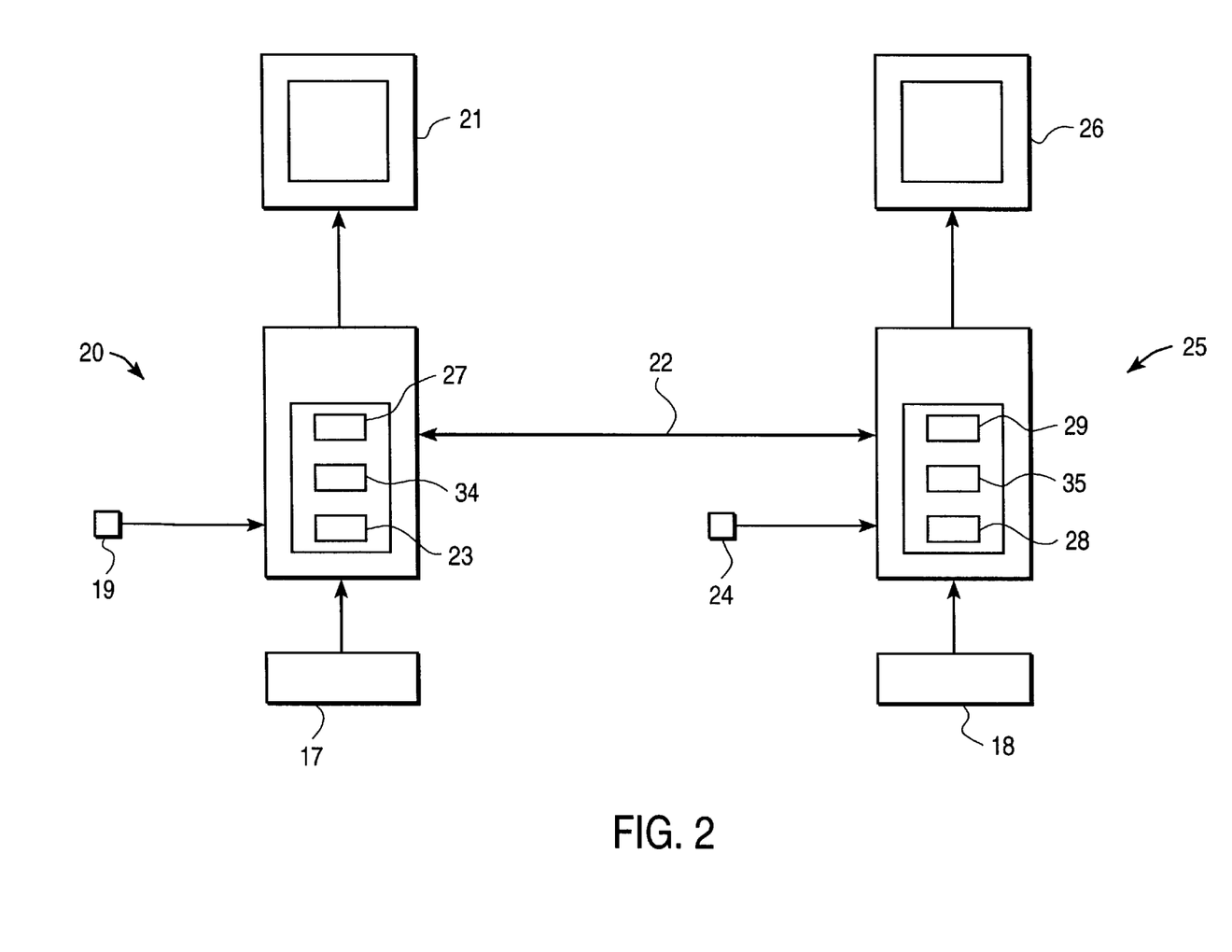
FIG. 2 is an embodiment of a digital communications system embodying the invention.

As shown in FIG. 2, an embodiment of a digital communications system embodying the invention, the transmit and receive nodes can be personal computers 20 and 25, having monitors 21 and 26, keyboards 17 and 18, and mouse input devices 19 and 24, respectively. Each of computers 20 and 25 has a respective processor, 27 and 29, which preferably are high performance Pentium® or Pentium® Pro processors manufactured by Intel Corporation. Computers 20 and 25 have respective memories, such as random access memories 34 and 35, into which machine-executable programs can be loaded and executed by respective processors 27 and 29. Where the transmission medium 22 is analog, such as a telephone line, the personal computers 20 and 25 must be interfaced to one another through internal or external modems. In the embodiment shown in FIG. 2, computer 20 has internal modem 23. Computer 25 has internal modem 28. Modems 23 and 28 can be modems which operate in accordance with International Telecommunication Union (ITU) recommendation V.34 (9/94)—*A MODEM OPERATING AT DATA SIGNALING RATES OF UP TO 28,800 BIT/S FOR USE ON THE GENERAL SWITCHED TELEPHONE NETWORK AND ON LEASED POINT-TO-POINT 2-WIRE TELEPHONE-TYPE CIRCUITS* (V.34).

The signal constellation 10 is a subset of all possible points on grid 13 defined by X axis 11 and Y axis 12. In the example shown, signal constellation 10 has 32 points. Each point in this example represents 5 bits, for example, from binary 00000 to binary 11111. It should be understood that the size of signal constellation 10, and of grid 13 shown in FIG. 1 is for illustration only and is generally a small scale representation of an actual signal constellation and grid. For example, in communications according to the V.34 standard, the signal constellation can have up to 960 points with each point representing up to 9 bits of binary data.

Figure 3:
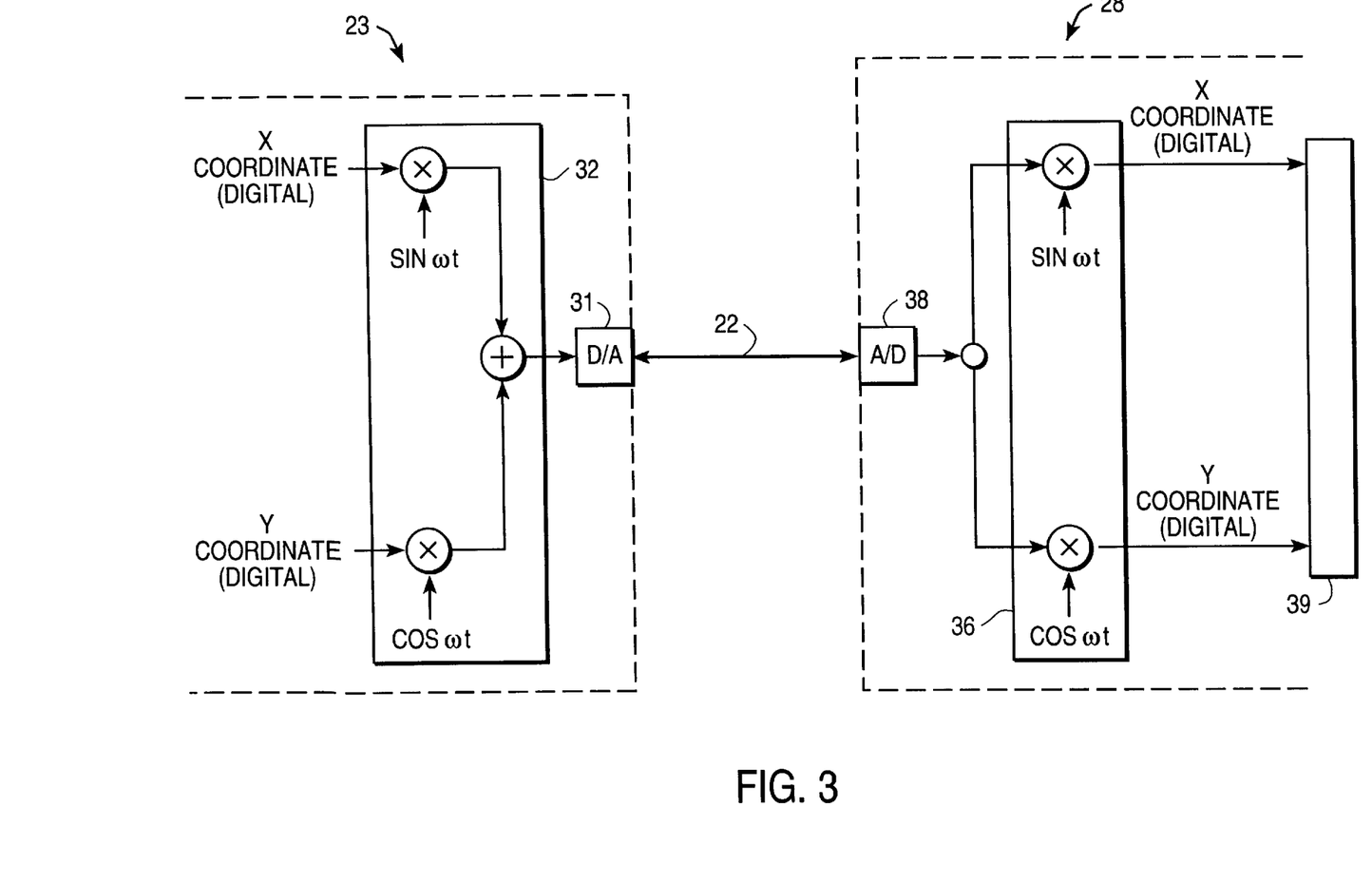
FIG. 3 is a block diagram of a modem interface in the digital communications system of FIG. 2.
Figure 4:
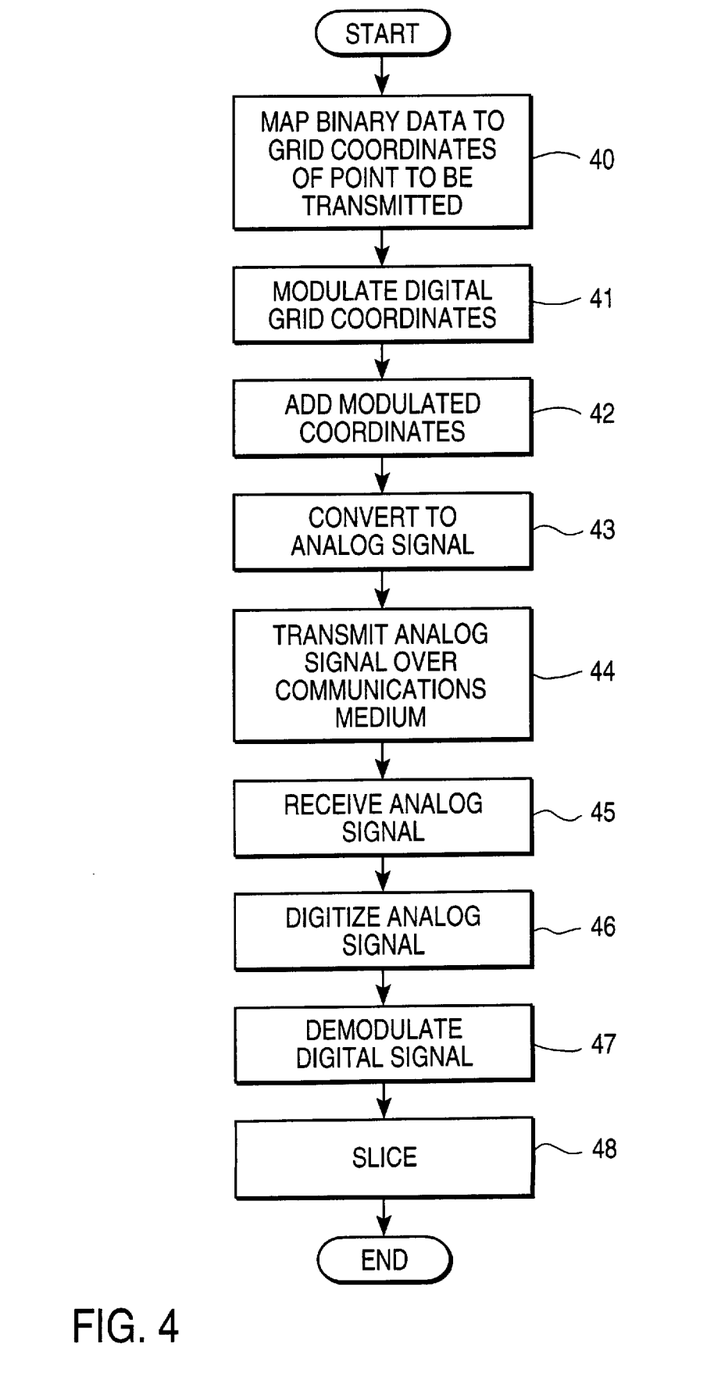
FIG. 4 is a flow chart showing signal transmission and receiving steps.

With additional reference to FIG. 3, a block diagram of the modem interface between computers 20 and 25 (it should be understood that only the modulation section of modem 23 and the demodulation section of modem 28 are shown), and FIG. 4, a flow chart showing signal transmission and receiving steps, to transmit a signal from a transmit node, for example computer 20, to a receive node, for example computer 25, a five bit label representing a point (data value) to be transmitted is mapped to its X and Y grid coordinates (step 40 of FIG. 4). For example, to transmit the sequence of 5 bits represented by point 14 in FIG. 1, the sequence is first mapped to its grid coordinates: $(-1^{(X)}, 3^{(Y)})$. It should be understood that the values -1 and 3 represent analog voltages which also can be represented by unique digital numbers, preferably in twos complement format. The value of the digital numbers typically are dependent on the type of digital to analog (D/A), and analog to digital (A/D) converters used by modems 23 and 28, such as D/A 31 and A/D 38. The unique digital numbers representing the X and Y coordinates are modulated (step 41). The binary X coordinate is modulated by a sine wave carrier in modulator 32. The binary Y coordinate is modulated by a cosine wave carrier in modulator 32. Modulator 32 further adds the modulated X and Y coordinates (step 42).

The modulated and added X and Y coordinates are converted to an analog waveform or amplitude by D/A 31 (step 43) for transmission across communications medium 22 (step 44).

Modulation of the X coordinate by sine and of the Y coordinate by cosine offsets the analog voltage or waveforms representing the X and Y coordinates by 90 degrees with respect to one another, thereby inhibiting any interference between the signals when they are simultaneously transmitted.

At the side of receive node 25, including modem 28, the analog signal is received (step 45) and is converted to a digital signal by A/D converter 38 (step 46). The digital signal is sent to demodulator 36, which demodulates the sine and cosine wave carriers from the signal (step 47).

It should be understood by persons of ordinary skill that various electronic processing steps associated with modems 23 and 28, such as equalization and gain adjustments, have been omitted from this disclosure. Such processing affects various attributes of the signals both before transmission and after reception. For example, a signal received by receive node 25 might not be in a form ready for processing by the invention until such prior processing is completed. However, for purposes of this disclosure, such other processing need not be discussed and it will be assumed the signals are transmitted and received in a form and magnitude ready for processing by the invention.

The received X and Y coordinate values from the output of demodulator 36 are "sliced" using slicer 39 to determine the transmitted point (step 48).

Figure 5:
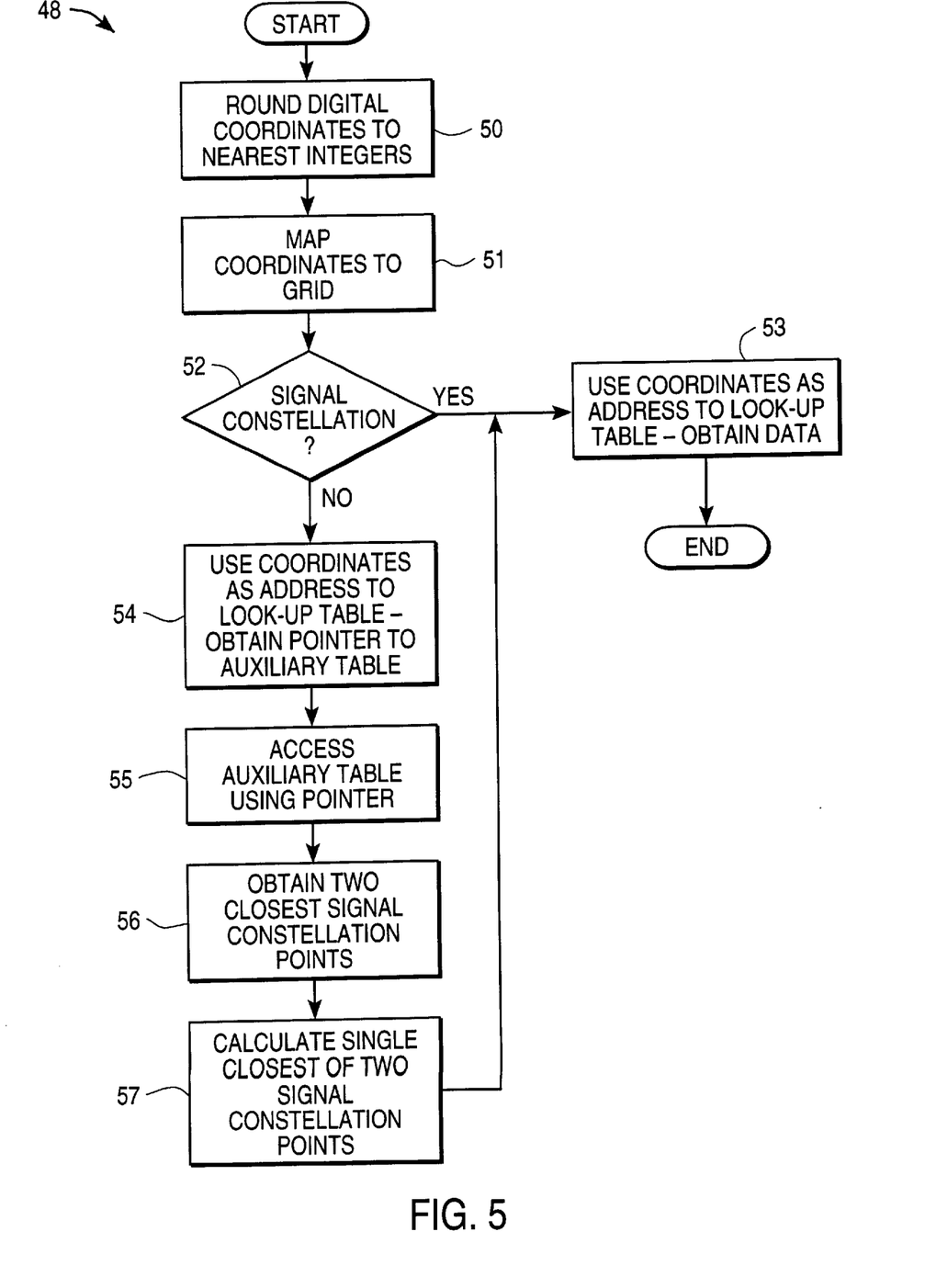
FIG. 5 is a flow chart of an implementation of an embodiment of the invention.
Figure 6:
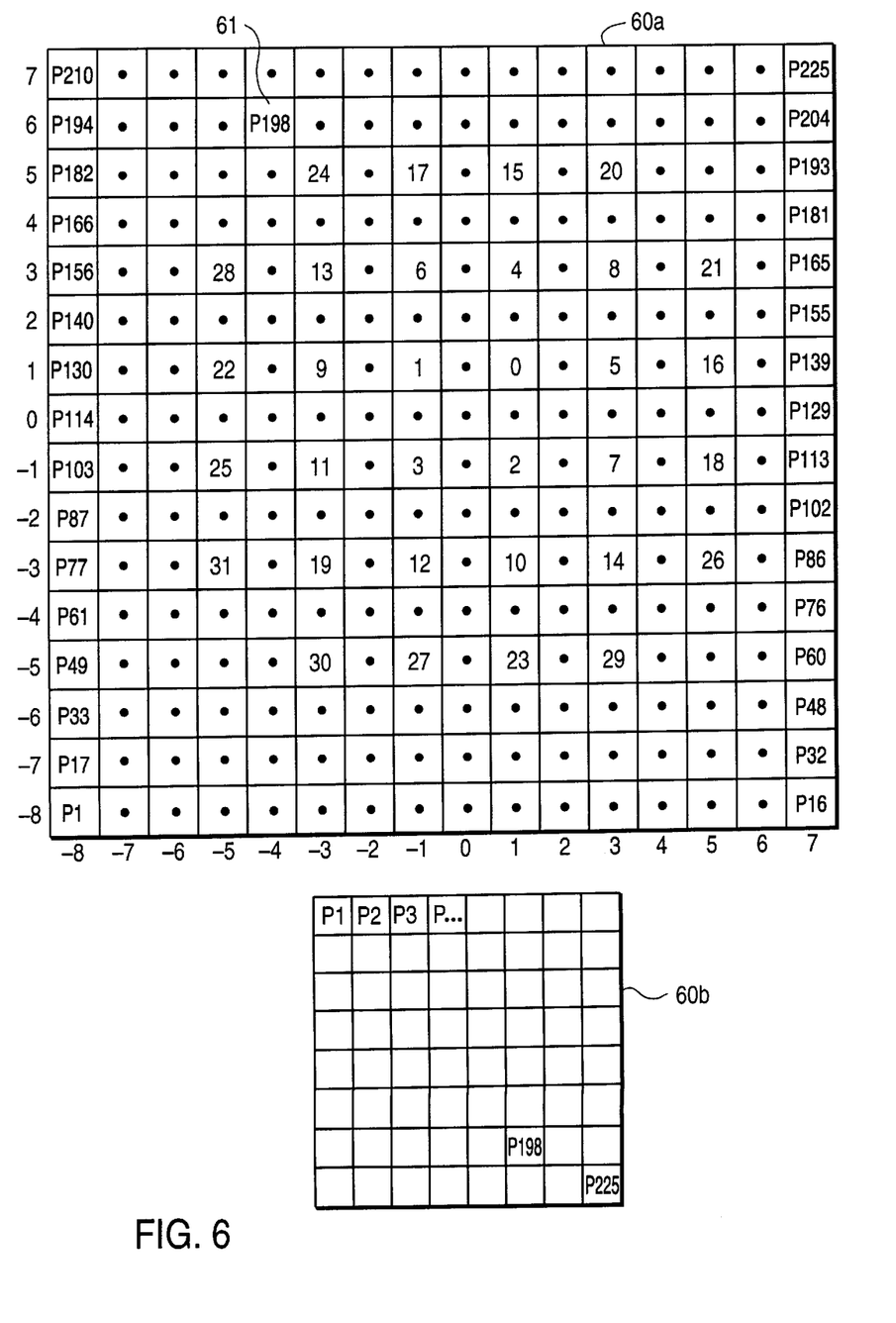
FIG. 6 is a table representing the grid of FIG. 1.

Referring to FIG. 5, a flow chart of an implementation of slicer 39 and of slicer step 48, during transmission the analog signals typically are affected by noise or the like such that A/D conversion and demodulation will not produce the original digital numbers representing the X and Y coordinates of the transmitted point. The digital numbers produced likely will not be integers. Therefore, the digital numbers representing the X and Y coordinates are rounded to the nearest integers (step 50 of FIG. 5). After rounding, the X and Y coordinates are mapped to the grid (step 51). Referring also to FIG. 6, a look-up table corresponding to grid 13, if the coordinates map to a signal constellation point on the grid (step 52), they are used as an address to table 60a to obtain the data represented by the transmitted point (step 53).

Table 60a stores data represented by the signal constellation points and indices to auxiliary table 60b for grid points that are not signal constellation points. In the above example, where the grid point to which the X and Y coordinates map is a signal constellation point as determined by step 52, such as point 14, the receive node, such as computer 25, uses the binary numbers representing the X and Y coordinates, rounded to the nearest integers in step 50, as indices or addresses to table 60a to find the data represented by signal constellation point 14 (step 53). In this example, computer 25 would access the memory cell labeled "6" in table 60a to obtain the data represented by the transmitted point. In a V.34 modem, a digital number up to 9 bits in width would be stored in a particular memory cell of table 60a which corresponds to a signal constellation point.

The coordinates received could map to point 15 in grid 13. As can be seen, point 15 is within but does not correspond identically to a point on signal constellation 10. After rounding the digital coordinates of point 15 to the nearest integers (step 50), the coordinates map to point 17 in signal constellation 10 of grid 13 (step 51). In the example shown, the X coordinate is rounded to the digital integer corresponding to the analog voltage 3 and the Y coordinate is rounded to the digital integer corresponding to the analog voltage 3 (step 50). Again, the particular digital coordinates corresponding to these analog voltages are functions of the implementation details of the invention, particularly D/A 31 and A/D 38. The rounded digital integer coordinates are mapped to the grid (step 51) and correspondingly to signal constellation point 17 (step 52). Since the rounded digital integer coordinates of point 15 map to a signal constellation point (step 52), the coordinates are used as an address to table 60a to obtain the transmitted data (step 53). In this case, the address in table 60a labeled "8" is accessed. As shown, the signal constellation point accepted as being representative of the transmitted signal constellation point will be the signal constellation point closest to where received point 15 actually lies in signal constellation 10.

In an embodiment, rounding to the nearest integer is accomplished by adding 0.5 to the values provided by demodulator 36, and truncating.

The invention initially processes received points which are not within a boundary of signal constellation 10 in identical manner. For example, the coordinates of a point received on or outside of a boundary of signal constellation 10, such as point 16, are rounded to their nearest integers (step 50). The rounded digital coordinates are mapped to a point on grid 13 (step 51). In this case, the coordinates will not map to a signal constellation point (step 52). In an embodiment of the invention, the coordinates are used as addresses or indices to slicer table 60a (step 54) in the same manner as if point 16 mapped to a grid point which was also a signal constellation point. In this case, however, the coordinates address an entry in slicer table 60a which holds a pointer to auxiliary table 60b (step 54). Auxiliary table 60b is accessed using the pointer as an address (step 55). The auxiliary table 60b stores, for each possible received point which falls outside or on a boundary of signal constellation 10, a pair of possible closest signal constellation points, one of which is the possible transmitted signal point. Therefore, auxiliary table 60b stores in one of its memory locations (p1 ... p225) a pair of possible signal constellation points which might represent point 16, before it was affected by noise or the like, possibly during its transmission over transmission medium 22. These points are obtained (step 56) when the auxiliary table is accessed using the pointer from table 60a. Receive node 25 need only run comparison calculations to determine which of the two points obtained from auxiliary table 60b is the single constellation point closest to point 16 (step 57). The coordinates of the signal constellation point which is determined to be closest are used as an address to obtain from table 60a the data associated with that signal constellation point, which is accepted as the intended transmitted data (step 53).

Figure 7:
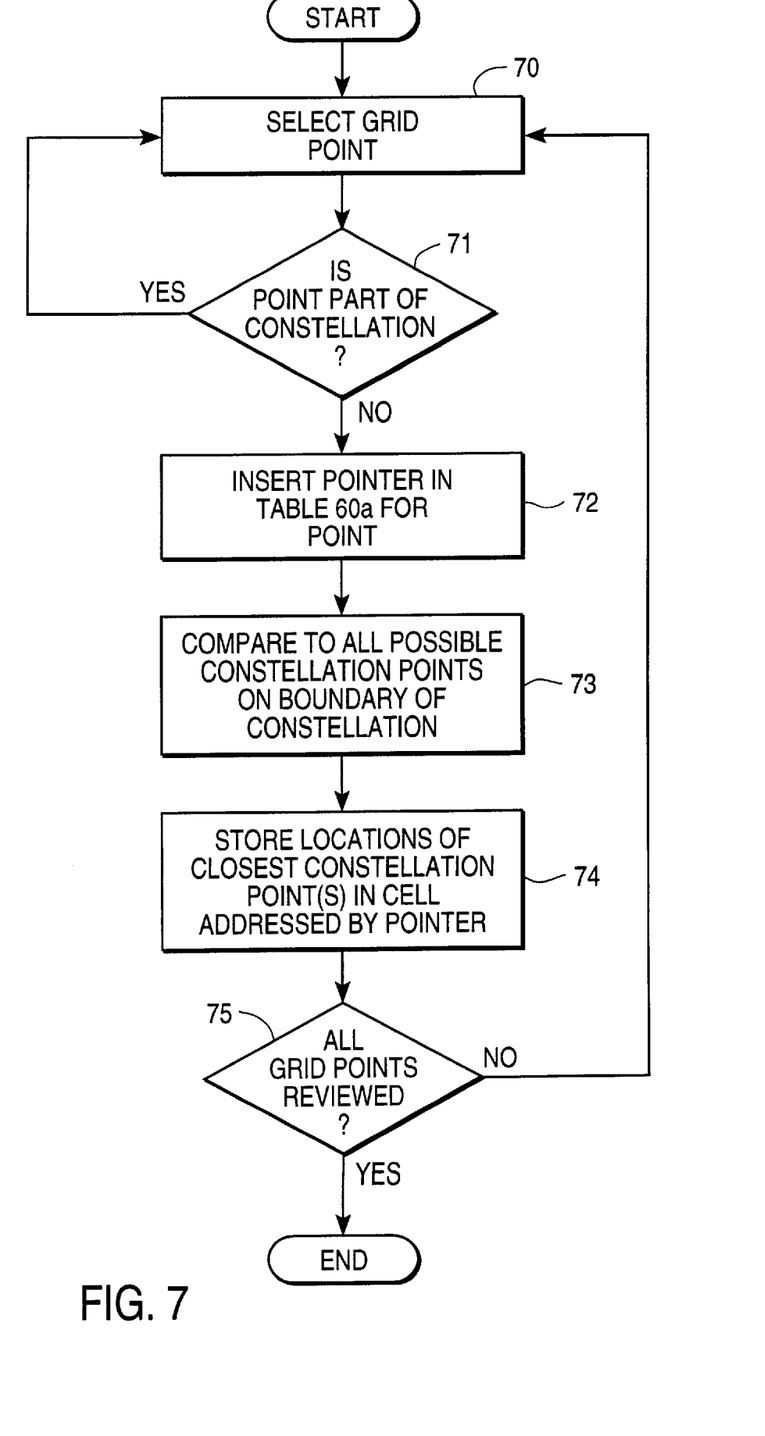
FIG. 7 is a flow chart of steps used in creating the auxiliary table.

Referring to FIG. 7, a flow chart of steps used in creating auxiliary table 60b, auxiliary table 60b is created in advance, and typically is done by computer simulation. In an embodiment of the invention, for example using appropriate software which can be developed by a person of ordinary skill having reference to this disclosure, the computer selects a grid point (step 70 of FIG. 7) and determines whether it is part of signal constellation 10 (step 71). If it is not part of signal constellation 10, a unique pointer is inserted in table 60a addressable by the coordinates of the grid point (step 72). The point is compared with each of the signal constellation points on the boundary of signal constellation 10 (step 73). By this comparison, the computer can determine which points on the boundary of signal constellation 10 likely are the closest to each grid point outside of signal constellation 10. Empirical experimentation has shown that for any received point outside of signal constellation 10 which can be mapped to a nearest grid point outside of signal constellation 10, the number of closest possible boundary signal constellation points is no more than two. The two closest boundary signal constellation points for a point outside of signal constellation 10 which can be mapped to a nearest grid point outside of signal constellation 10 are determined by the computer, and stored in a unique cell of auxiliary table 60b addressed by the unique pointer (step 74). The process is repeated for all grid points to generate auxiliary table 60b (step 75).

Typical operation using auxiliary table 60b of the invention would occur as follows. Digitized and demodulated signals at receive node 28 are rounded to the nearest integers (step 50). These integers represent X and Y coordinates, respectively, to a point on grid 13 (step 51), but they also represent an index or address to look-up table 60a. Where the X and Y coordinates, rounded and truncated to the nearest integer, map to a grid point which is not within the bounds of signal constellation 10 (step 52), the storage cell addressed in table 60a holds a pointer, such as pointer 61 (p198), to auxiliary table 60b (step 54). Using pointer 61 (p198) as an index or address, a jump is made to the cell in auxiliary table 60b bearing the address (step 55). This cell holds the identity of the two signal constellation points on the boundary of signal constellation 14 which have been determined to be the two closest to the received point (step 56). The computer then compares the position of the received point to each of the two signal constellation points which have been obtained from auxiliary table 60b (step 57). The single, closest signal constellation point is determined from the comparison, and its coordinates are used as an address to access data which is accepted as the received data (step 53). It should be understood that the index of p198 given to pointer 61 in this example is for explanation purposes only. Typically, pointer 61 would be a binary address to auxiliary table 60b.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A method for mapping a received signal to a signal constellation comprising:

mapping the received signal to a coordinate grid which has the signal constellation thereon;

determining an entry in a first table corresponding to a mapped grid coordinate for the received signal;

obtaining data from the entry in the first table, if the received signal is within a boundary established for the signal constellation;

obtaining a pointer from the entry in the first table to point to an entry in a second table, if the received signal is on or outside of the boundary;

obtaining a plurality of possible constellation points located on the boundary from the entry in the second table if the second table is used;

comparing the possible constellation points in the second table entry to determine which constellation point on the boundary is closest to the grid coordinate of the received signal, when the second table is used; and using the constellation point on the boundary closest to the grid coordinate of the received signal as an intended constellation point for the received signal to obtain data from a corresponding entry in the first table.

2. The method of claim 1, wherein said obtaining and comparing the plurality of possible constellation points include comparing the grid coordinate of the received signal to two possible constellation points located on the boundary to determine the intended constellation point.

3. The method of claim 2, wherein said mapping the received signal includes rounding a signal coordinate to integers on a X–Y coordinate gred to obtain the entry in the first table.

4. The method of claim 1 wherein said mapping the received sihnal includes rounding a signal coordinate to integers on a X–Y coordinate grid to obtain the entry in the first table.

5. A machine readable medium having resident thereon programmed instructions for mapping a received signal point to one of a set of points of a signal constellation, the instructions when executed by a processor, cause the processor to perform comprising:

mapping the received signal point to a coordinate grid which has the signal constellation thereon;

determining an entry in a first table corresponding to a mapped grid coordinate for the received signal point;

obtaining data from the entry in the first table, if the received signal point is within a boundary established for the signal constellation;

obtaining a pointer from the entry in the first table to point to an entry in a second table, if the received signal point is on or outside of the boundary;

obtaining a plurality of possible constellation points located on the boundary from the entry in the second table if the second table is used;

comparing the possible constellation points in the second table entry to the received signal point to determine which constellation point on the boundary is closest to the grid coordinate of the received signal point, when the second table is used; and using the constellation point on the boundary closest to the grid coordinate of the received signal point as an intended constellation point for the received signal point to obtain data from a corresponding entry in the first table.

6. The machine readable medium of claim 5, wherein said obtaining and comparing the plurality of possible constellation points include comparing the grid coordinate of the received signal point to two possible constellation points located on the boundary to determine the intended constellation point.

7. The machine readable medium of claim 6, wherein said mapping the received signal point includes rounding a signal coordinate to integers on a X–Y coordinate grid to obtain the entry in the first table.

8. The machine readable medium of claim 5, wherein said mapping the received signal point includes rounding a signal coordinate to integers on a X–Y coordinate grid to obtain the entry in the first table.

9. A computer system for mapping a received signal point to one of a set of points of a signal constellation comprising:

a processor; and a memory coupled to the processor, wherein the memory is to store a sequence of instructions which, when executed by the processor, cause the processor to map the received signal point to a coordinate grid which has the signal constellation thereon;

a first table coupled to said processor;

a second table coupled to said processor;

said processor to select an entry in a first table corresponding to a mapped grid coordinate for the received signal point to obtain data from the entry in the first table, if the received point is within the boundary; and said processor to select an entry in the first table which contains a pointer to point to an entry in the second table if the received point is not within the boundary, the entry in the second table containing a plurality of possible constellation points located on the boundary from which an intended constellation point for the received signal point is selected by comparing which of the possible constellation points in the entry of the second table is closest to the received signal point.

10. The computer system of claim 9, wherein the processor compares the received signal point to only two possible constellation points located on the boundary from the entry in the second table to determine the intended constellation point.

11. The computer system of claim 10 wherein said processor compares the two possible constellation points from the second table to determine the intended constellation point for the received signal point, and in which a corresponding entry in the first table is accessed to obtain data.

12. The computer system of claim 11, wherein said processor rounds to integer the received signal point to map the received signal point onto a X–Y coordinate grid.

13. The computer system of claim 9 wherein said processor compares the plurality of constellation points from the second table to determine the intended constellation point for the received signal point, and in which a corresponding entry in the first table is accessed to obtain data.

14. An apparatus for mapping a received signal point to one of a set of points of a signal constellation comprising:

a processor to map the received signal point to a coordinate grid which has the signal constellation thereon, in which the grid coordinate of the received signal point is used as an address;

a first look-up table having entries which are addressed by the grid coordinate, said first look up table coupled to said processor;

a second look-up table coupled to said processor and having entries which are pointed to by entries in the first look-up table;

said processor to obtain data from the first look-up table which corresponds to the received signal point, if the received point is within a boundary of the signal constellation, and said processor to obtain a pointer to an entry in the second look-up table to retrieve a plurality of possible constellation points located on the border of the signal constellation, if the received point is not within the boundary, and in which at least two possible constellation points on the border of the constellation are compared to the received signal point to determine which is closest to the received signal point;

said processor processing the closest selected constellation point from the second look-up table to obtain data from a corresponding entry in the first look-up table.

15. The apparatus of claim 14, wherein said processor compares the received point to only two possible constellation points in the second look-up table.

16. The apparatus of claim 15 further including a memory wherein the first look-up table and the second look-up table are resident in said memory which is coupled to said processor.

17. The apparatus of claim 16, wherein said processor rounds to integers the received signal point to map the received signal point onto a X–Y coordinate grid.

18. The apparatus of claim 14 wherein said processor compares the plurality of possible constellation point entries from the second look-up table to determine the closest constellation point on the border to the received point when the received point is on or outside of the signal constellation, and in which a corresponding entry in the first table is then accessed.

* * * * *

UNITED STATES PATENT AND TRADEMARK OFFICE
CERTIFICATE OF CORRECTION

PATENT NO.     : 6,154,502
DATED          : November 28, 2000
INVENTOR(S)    : Brun et al.

It is certified that error appears in the above-identified patent and that said Letters Patent is hereby corrected as shown below:

<u>Column 6,</u>
Line 44, delete "gred" and insert -- grid --.
Line 47, delete "sihnal" and insert -- signal --.

Signed and Sealed this

Thirtieth Day of April, 2002

Attest:

JAMES E. ROGAN
*Attesting Officer*     *Director of the United States Patent and Trademark Office*